United States Patent

Nagashima et al.

[11] Patent Number: 5,241,558
[45] Date of Patent: Aug. 31, 1993

[54] VERTICAL GLASS MELTING FURNACE

[75] Inventors: Yukihito Nagashima; Kouichi Sakaguchi; Shigeki Nakagaki; Seiichiro Manabe; Yoshiyuki Inaka; Takashi Sunada; Hiroyuki Tanaka, all of Osaka, Japan

[73] Assignee: Nippon Sheet Glass Co., Ltd., Osaka, Japan

[21] Appl. No.: 849,584

[22] Filed: Mar. 11, 1992

[30] Foreign Application Priority Data

Mar. 18, 1991 [JP] Japan ............................ 3-78643

[51] Int. Cl.⁵ .................................................. C03B 5/02
[52] U.S. Cl. .................................... 373/27; 373/29; 373/30; 373/32; 373/116; 65/27; 65/29; 65/335
[58] Field of Search ........................... 373/27-35, 373/39, 109, 111, 115, 116, 117, 127; 65/29, 27, 335, 347

[56] References Cited

U.S. PATENT DOCUMENTS

| | | | |
|---|---|---|---|
| 1,603,221 | 10/1926 | Thomson | 373/30 |
| 2,244,267 | 6/1941 | Slayter et al. | 373/29 |
| 2,749,379 | 6/1956 | Geffcken et al. | 373/39 |
| 2,780,890 | 2/1957 | Russel | 373/30 |
| 3,850,606 | 11/1974 | Rough | 373/29 |
| 4,262,158 | 4/1981 | Lynch | 373/28 |
| 4,312,658 | 1/1982 | Mayer | 65/29 |
| 4,366,571 | 12/1982 | Palmquist | 373/30 |
| 4,927,446 | 5/1990 | Manabe et al. | 65/347 |
| 5,100,453 | 3/1992 | Richards | 65/27 |

FOREIGN PATENT DOCUMENTS

| | | |
|---|---|---|
| 0108566 | 5/1984 | European Pat. Off. . |
| 0325055 | 7/1989 | European Pat. Off. . |
| 2-199030 | 8/1990 | Japan . |
| 1498184 | 1/1978 | United Kingdom . |

Primary Examiner—Bruce A. Reynolds
Assistant Examiner—Tu Hoang
Attorney, Agent, or Firm—Kanesaka and Takeuchi

[57] ABSTRACT

A vertical glass melting furnace of the type having an inlet for raw materials at the top thereof, an outlet for molten glass at the bottom thereof, and a tabular electric resistance heating element for melting which is immersed at some level in molten glass, has at least one opening, and covers almost entirely the cross-section of the furnace at that level, the vertical glass melting furnace comprising a stirrer which extends from above the furnace and passes through the batch layer and the tabular heating element so that the stirrer brings about forced circulation for homogenization of the molten glass which has passed through the tabular heating element and stays in the region below the tabular heating element.

8 Claims, 3 Drawing Sheets ive embodiment (glass

VERTICAL GLASS MELTING FURNACE

BACKGROUND OF THE INVENTION

1. Field of the Invention

The present invention relates to a vertical glass melting furnace to afford homogenized molten glass. More particularly, it is concerned with a vertical glass melting furnace to afford highly homogenized molten glass free of bubbles and unmelted substances entrapped therein owing to an electric resistance heating element immersed in the molten glass.

2. Description of the Prior Art

There are several methods for homogenizing molten glass in a glass melting furnace. They are based on mixing by convection or gas bubbling.

There is disclosed in Japanese Patent Laid-open No. 199030/1990 a method for homogenizing molten glass in a glass melting furnace. This method is applicable to a vertical glass melting furnace having an inlet for raw materials at the top thereof, an outlet for molten glass at the bottom thereof, and at least one electric resistance heating element immersed in molten glass at some level thereof such that it covers almost entirely the cross-section of the furnace at that level. According to this method, homogenization is accomplished by the convection of molten glass which is induced by a heating element for homogenization installed in the furnace.

In the case of homogenization by forced circulation with a stirrer, it is common practice to install a homogenizing tank separately from the melting furnace, thereby eliminating entrapment of bubbles and unmelted substances in molten glass by stirring.

There is a different situation in a vertical glass melting furnace of the type in which raw materials cover the surface of molten glass (forming so-called cold top) so as to reduce heat loss from the top of the furnace and the melting of raw materials is accomplished by applying an electric current directly to the molten glass. In this case, efforts to promote homogenization of molten glass by vigorous convection causes with entrapment of bubbles and unmelted substances in molten glass. Thus, with such a glass melting furnace, it is difficult to produce homogenized glass free of entrapped bubbles and unmelted substances. The same difficulties as above are also encountered in the case of forced circulation by a stirrer.

OBJECT AND SUMMARY OF THE INVENTION

It is an object of the present invention to provide a vertical glass melting furnace that affords homogeneous molten glass free of entrapped bubbles and unmelted substances.

The present invention is embodied in a vertical glass melting furnace of the type having an inlet for raw materials at the top thereof, an outlet for molten glass at the bottom thereof, and a tabular electric resistance heating element for melting which is immersed at some level in molten glass, has at least one opening, and covers almost entirely the cross-section of the furnace at that level, the vertical glass melting furnace comprising a stirrer which extends from above the furnace and passes through the batch layer and the tabular heating element so that the stirrer brings about forced circulation for homogenization of the molten glass which has passed through the tabular heating element and stays in the region below the tabular heating element.

The vertical glass melting furnace of the present invention permits molten glass to flow down through the heating element, without appreciable turbulence above the heating element. The molten glass below the heating element undergoes forced circulation by the stirrer for homogenization. Thus there is obtained homogeneous molten glass free of bubbles and unmelted substances.

For the vertical glass melting furnace to work satisfactorily, the following requirements should be met.

There should be no short pass along which molten glass flows toward the furnace outlet in a short time.

There should be no stagnation of molten glass.

Molten glass below the heating element should undergo sufficient shearing by the stirrer.

The flow of molten glass toward the heating element should be very weak.

The present inventors found that the foregoing requirements are met with the vertical glass melting furnace provided with a tabular electric resistance heating element, if proper selections are made of the shape, size, position, and rotary speed of the stirrer, and the configuration of the cross-section of that region of the furnace where stirring takes place.

The electric resistance heating element uniformly melts the glass batch, and the resulting molten glass passes through the openings of the heating element. Then the molten glass is mixed efficiently by forced circulation induced by the stirrer in the region where the stirrer is positioned.

The vertical glass melting furnace of the present invention is constructed such that a stirrer is immersed in molten glass below the electric resistance heating element for melting. This stirrer brings about forced circulation for efficient mixing in the molten glass without appreciable turbulence above the heating element. Japanese Patent Laid-open No. 199030/1990 discloses a method for melting glass by means of a tabular heating element in a glass melting furnace. This method has an advantage of eliminating defective molten glass entrapping bubbles and unmelted substances therein due to reduced convection and insufficient heating and also eliminating the uneven melting of the surface batch. With the present invention, it is possible to improve the quality of molten glass without losing the advantage of Japanese Patent Laid-open No. 199030/1990.

In the vertical glass melting furnace for the present invention, the electric resistance heating element for molten glass functions also as a baffle plate for the flow of molten glass produced by the stirrer. This baffle plate permits the use of a strong stirring which would cause entrapment of bubbles and unmelted substances in a furnace so designed as to perform melting by the direct application of an electric current through electrodes immersed in molten glass.

In the vertical glass melting furnace of the present invention, the region below the tabular heating element where the stirrer is immersed should have an adequate cross-sectional shape. An octagonal shape is desirable from the standpoint of furnace construction and glass homogeneity. A circular cross-section is more desirable for higher homogeneity, and a square cross-section may be acceptable for lower homogeneity.

DESCRIPTION OF THE PREFERRED EMBODIMENTS

The embodiment of the present invention will be described in more detail with reference to the accompanying drawings.

Figure 1:
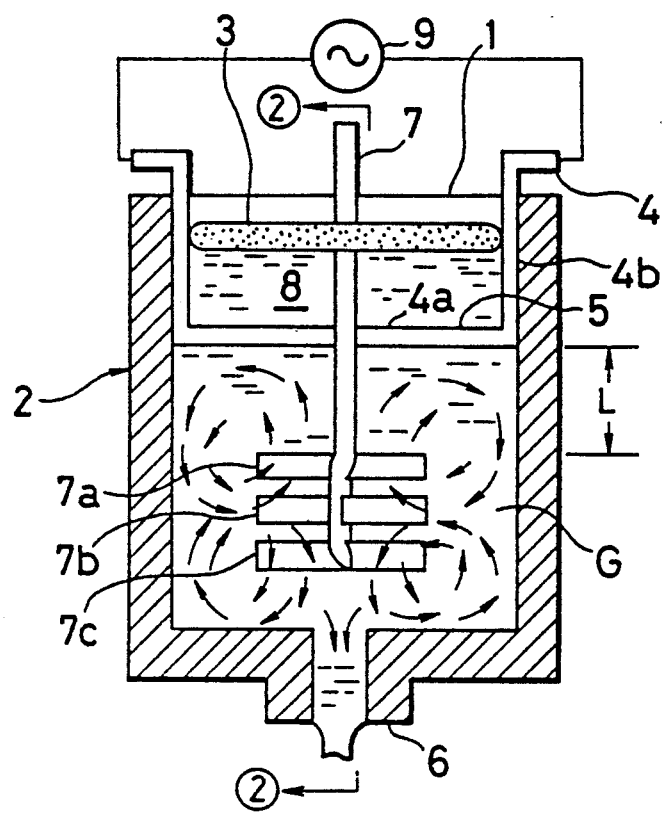
FIG. 1 is a cross-sectional view taken along the line ①-① in FIG. 3 of a preferred embodiment (glass melting furnace of the present invention.
Figure 2:
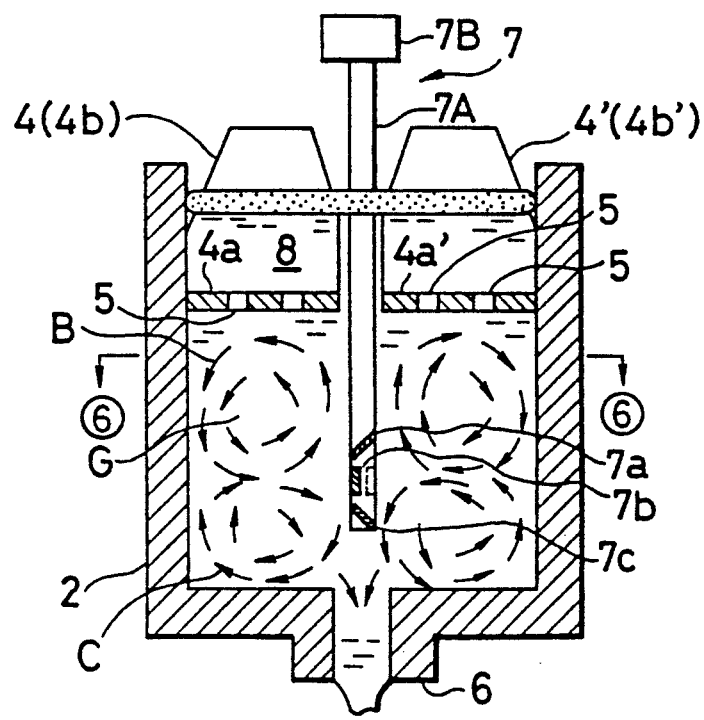
FIG. 2 is a cross-sectional view taken along the line ②-② in FIGS. 1 and 3.
Figure 3:
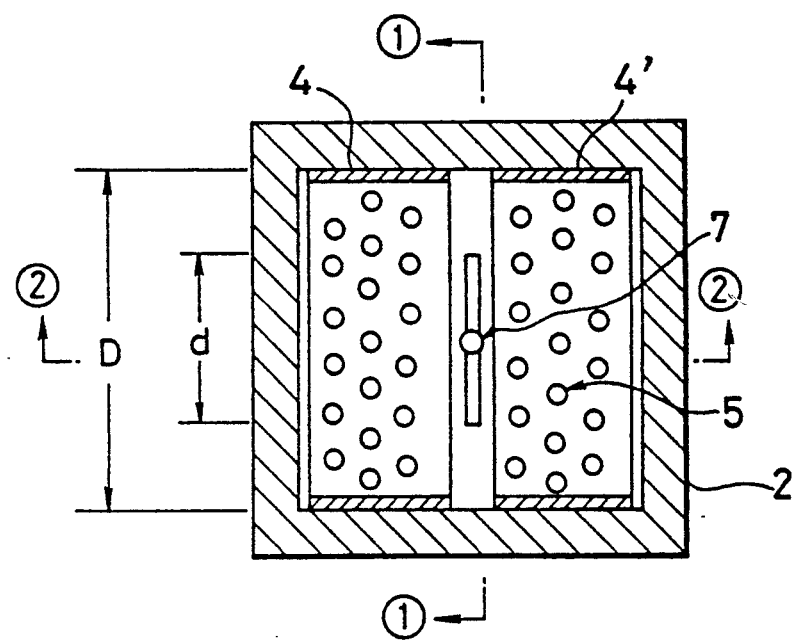
FIG. 3 is a horizontal sectional view showing the relative positions of the stirrer and heating element.

Referring to FIG. 1, there is shown a furnace proper 2 made up of tank blocks. The furnace proper 2 has a square inlet 1 for raw materials at the top thereof and an outlet 6 for molten glass at the bottom thereof which is a throat projecting downward in this embodiment. The furnace proper 2 holds molten glass G therein. On the molten glass G is formed a batch layer 3 of uniformly fed raw materials. At some level in the molten glass is installed an electric resistance heating element 4 (4'). This heating element has a tabular heating part 4a (4a') in which are formed openings 5. The tabular heating part 4a (4a') covers almost entirely the cross-section of the furnace at the level where it is positioned. The region of the furnace below the tabular heating part 4a (4a') has an octagonal cross-section.

The resistance heating element 4 (4') for melting has a tabular heating part 4a (4a') in which are formed a multiplicity of uniformly spaced openings 5, and also has terminals 4b (4b') at both ends thereof which are connected to a power source 9. The openings 5 in the resistance heating element 4 should be of the same size and shape and be positioned at regular intervals so as to ensure uniform horizontal temperature distribution in the molten glass G.

The resistance heating element 4 (4') for melting consists of paired parts, each covering approximately the half of the horizontal cross-section of the furnace, so that the shaft 7A of the stirrer 7 can be passed through it from above the furnace. The halves 4 and 4' of the resistance heating element for melting should be positioned at a certain distance apart so that the shaft 7A of the stirrer 7 can be passed through the gap between them. The gap between 4 and 4' should be wide enough for the free passage of the shaft 7A of the stirrer 7 but be as narrow as possible so as to prevent the outflow of molten glass containing bubbles and unmelted substances due to insufficient heating. For example, it should be smaller than 60 mm for a shaft 30 mm in diameter.

Figure 4:
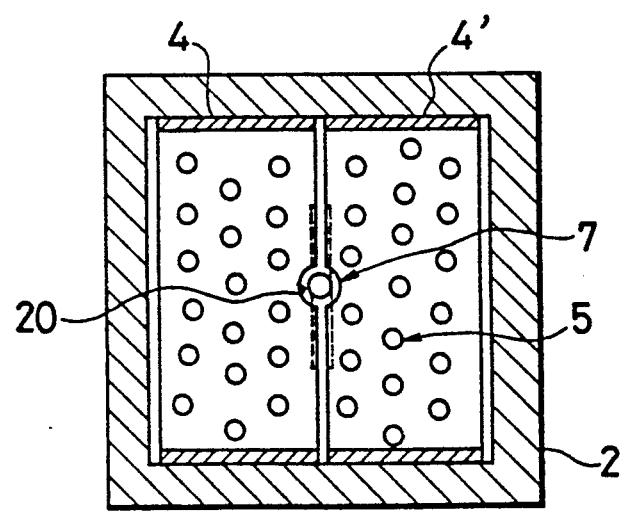
FIG. 4 is a horizontal sectional view showing the relative position of the stirrer and heating element.
Figure 5:
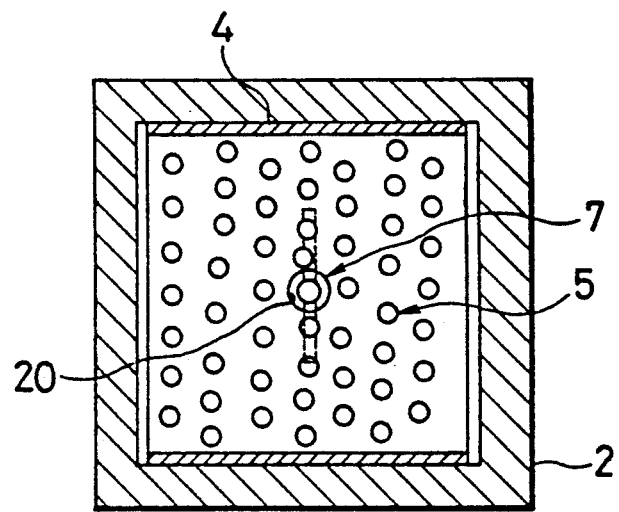
FIG. 5 is a horizontal sectional view showing the relative position of the stirrer and heating element.
Figure 6:
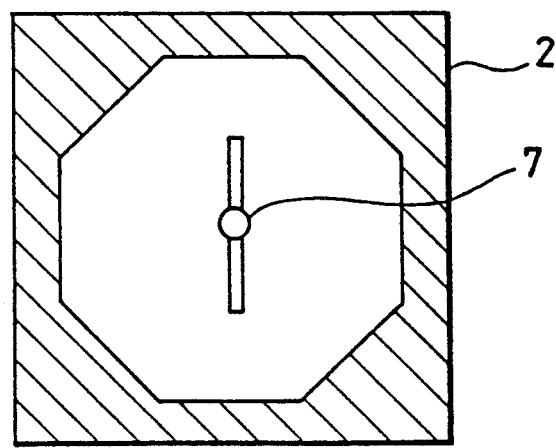
FIG. 6 is a horizontal sectional view taken along the line ⑥-⑥ in FIG. 2 of that part of the furnace below the heating element.

In addition to the foregoing, there is another method for installing the stirrer. For example, it is possible to make an opening 20 in the heating element through which the shaft of the stirrer is passed as shown in FIGS. 4 and 5. The stirrer 7 is driven by a motor 7B placed at the top of the furnace proper 2.

Proper selections should be made for the position of the stirrer and the shape, size, and rotary speed of the stirring blades so as to carry out sufficient homogenization while avoiding a strong flow of molten glass in the region 8 above the heating element 4 (4') and an outflow of molten glass containing bubbles and unmelted substances due to insufficient heating. Since the heating element 4 (4') functions as a baffle plate for the flow of molten glass below it and also as a separator for molten glass above it, the vertical glass melting furnace of the present invention permits more vigorous stirring than the furnace designed to melt glass by the direct application of electricity.

The stirrer has upper blades 7a, middle blades 7b, and lower blades 7c. The upper blades 7a are inclined downward with respect to the direction of rotation) so that they produce upward flows in molten glass as indicated by arrows B. The middle blades 7b are held vertical so that they stretch molten glass as they rotate. The lower blades 7c are inclined upward (with respect to the direction of rotation) so that they produce downward flows in molten glass as indicated by arrows C. The stirring blades should preferably be large for sufficient homogenization. However, an adequate size is defined by $0.3 < d/D < 0.5$, where d is the length (or rotating diameter) of the blade and D is the minimum width across the furnace. The reason for this size is that the flow of molten glass near the heating element 4 (4') should be weak so that the molten glass above the heating element undergoes adequate thermal history.

The stirrer 7 should not be positioned too close to the resistance heating element 4 (4') for melting so as to avoid entrapment of bubbles and unmelted substances by molten glass. The distance L between the upper blade 7a and the heating element 4 (4') should be greater than $d/2$.

The rotary speed of the stirrer depends on the position, shape, and size of the stirrer blades. A speed of 5-20 rpm was found adequate in the case where the center of the middle blade 7b is in the middle between the heating element and the furnace bottom. A higher rotary speed than this will cause entrapment of bubbles and unmelted substances and make unstable the batch layer in the upper part of the furnace.

As mentioned above, the present invention provides a glass melting furnace which homogenizes molten glass without entrapment of bubbles and unmelted substances on account of its stirrer to bring about forced circulation for uniform mixing. Thus, this glass melting furnace affords molten glass with high quality and homogeneity.

What is claimed is:

1. A vertical glass melting furnace having an inlet for raw materials at a top, an outlet for molten glass at a bottom, and a tabular electric resistance heating element for melting which is immersed at a predetermined level in molten glass, has at least one opening, and covers substantially an entire cross-section of the furnace at said level, said vertical glass melting furnace comprising a stirrer which extends from above the furnace and passes through a batch layer and said heating element so that said stirrer forces circulations for homogenization of the molten glass which has passed through said heating opening and stays in a region below said tabular heating element.

2. A vertical glass melting furnace which comprises a furnace proper to hold molten glass and raw materials forming a batch layer on said molten glass, an inlet for raw materials at a top of said furnace proper, an outlet for molten glass at a bottom of said furnace proper, a tabular resistance heating element to heat molten glass which has openings for passage of molten glass and covers substantially an entire cross-section of said furnace proper at a predetermined level where it is immersed in molten glass, a shaft extending from above said furnace proper through said batch layer, into said molten glass and beyond said heating element, stirring blades attached to said shaft under said heating element, and means to drive said shaft.

3. A glass melting furnace as defined in claim 2, wherein said tabular resistance heating element is formed of paired halves with a gap between them which had a width to permit said shaft to pass through without contact and to prevent passage of bubbles and unmelted substances.

4. A glass melting furnace as defined in claim 2, wherein said stirring blades includes upper blades, middle blades, and lower blades, said upper blades being inclined downward with respect to a direction of rotation of the stirring blades so that the upper blades produce upward flows in the molten glass, said middle blades being held vertical so that the middle blades stretch molten glass as the middle blades rotate, and said lower blades being inclined upward with respect to the direction of rotation of the stirring blades so that the lower blades produce downward flows in the molten glass.

5. A glass melting furnace as defined in claim 2, wherein said stirring blades have a size defined by $0.3 < d/D, 0.5$, where d is the rotating diameter of the blade and D is a width across the furnace.

6. A glass melting furnace as defined in claim 2, wherein said furnace proper has an octagonal cross-section under said heating element.

7. A glass melting furnace as defined in claim 4, wherein said upper stirring blades are away from said heating element more than half the rotating diameter of said blades.

8. A glass melting furnace as defined in claim 2, wherein said heating element is a single heating element and said shaft is passed through one hole made in said heating element.

* * * * *